(12) United States Patent
Gibson et al.

(10) Patent No.: US 8,682,565 B2
(45) Date of Patent: *Mar. 25, 2014

(54) METHODS AND SYSTEMS FOR ENGINE STARTING

(71) Applicant: Ford Global Technologies, LLC, Dearborn, MI (US)

(72) Inventors: Alex O'Connor Gibson, Ann Arbor, MI (US); Ross Pursifull, Dearborn, MI (US); John D. Russell, Portland, OR (US); Joseph N. Ulrey, Dearborn, MI (US); Gopichandra Surnilla, West Bloomfield, MI (US); Donald James Lewis, Bath Springs, TN (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/735,962

(22) Filed: Jan. 7, 2013

(65) Prior Publication Data

US 2013/0124067 A1 May 16, 2013

Related U.S. Application Data

(63) Continuation of application No. 12/371,187, filed on Feb. 13, 2009, now Pat. No. 8,352,153.

(51) Int. Cl.
*B60T 7/12* (2006.01)
*G05D 1/00* (2006.01)
*G06F 7/00* (2006.01)
*G06F 17/00* (2006.01)
*G06F 19/00* (2011.01)
*G06G 7/70* (2006.01)

(52) U.S. Cl.
USPC .............. 701/103; 701/112; 123/179.4

(58) Field of Classification Search
USPC ........ 60/284; 123/90.15, 90.16, 90.17, 179.4, 123/685, 198 DB, 325, 179.16, 179.18, 123/179.5, 316, 348; 701/103, 112, 113
See application file for complete search history.

(56) References Cited

U.S. PATENT DOCUMENTS

| | | | |
|---|---|---|---|
| 6,170,475 B1 | 1/2001 | Lewis et al. |
| 6,578,551 B2 | 6/2003 | Yuya et al. |
| 6,711,489 B2 | 3/2004 | Haskara et al. |
| 6,718,939 B2 | 4/2004 | Iwasaki et al. |
| 6,880,523 B2 | 4/2005 | Iwasaki et al. |
| 6,935,295 B2 | 8/2005 | Marriott |
| 6,959,692 B2 | 11/2005 | Song et al. |
| 7,027,911 B2 | 4/2006 | Nishikawa et al. |
| 7,114,484 B2 | 10/2006 | Kaita et al. |

(Continued)

*Primary Examiner* — Stephen K Cronin
*Assistant Examiner* — Sizo Vilakazi
(74) *Attorney, Agent, or Firm* — Julia Voutyras; Alleman Hall McCoy Russell & Tuttle LLP

(57) ABSTRACT

Methods and systems are provided for controlling a vehicle system including an engine that is selectively deactivated during engine idle-stop conditions and selectively reactivated during engine restart conditions. One example method comprises, during an engine restart from an idle stop, performing a first combustion event in a cylinder with a piston at an engine crankshaft position that is after a crankshaft position at which said cylinder's exhaust valve opens, and before a crankshaft position at which the cylinder's intake valve closes, during a cycle of said cylinder. In this way, inaccuracies in cylinder aircharge estimation may be reduced, thereby also reducing air-fuel ratio errors and improving the quality and repeatability of engine restarts.

16 Claims, 6 Drawing Sheets

(56) References Cited

U.S. PATENT DOCUMENTS

| | | |
|---|---|---|
| 7,184,879 B1 | 2/2007 | Lewis |
| 7,225,793 B2 | 6/2007 | Schwulst et al. |
| 2002/0062799 A1* | 5/2002 | Murata et al. ............... 123/90.15 |
| 2003/0140881 A1* | 7/2003 | Makajima et al. .......... 123/179.3 |
| 2005/0139183 A1* | 6/2005 | Nohara et al. ............ 123/179.18 |
| 2006/0201481 A1* | 9/2006 | Reitz et al. .................... 123/316 |
| 2006/0231050 A1 | 10/2006 | Lewis et al. |
| 2006/0231051 A1 | 10/2006 | Winstead et al. |
| 2006/0266313 A1* | 11/2006 | Ishikawa et al. ........... 123/90.15 |
| 2007/0163531 A1 | 7/2007 | Lewis et al. |
| 2008/0092841 A1 | 4/2008 | Takahashi |
| 2008/0190107 A1* | 8/2008 | Ogiso ............................. 60/602 |

* cited by examiner

METHODS AND SYSTEMS FOR ENGINE STARTING

CROSS REFERENCE TO RELATED APPLICATIONS

The present application is a continuation of U.S. Patent application Ser. No. 12/371,187 filed on Feb. 13, 2009, the entire contents of which are incorporated herein by reference for all purposes.

FIELD

The present application relates to methods and systems for controlling an engine shut-down and/or a subsequent engine restart.

BACKGROUND AND SUMMARY

Vehicles have been developed to perform engine stop at idle conditions when specific conditions are met and then to automatically restart the engine when restart conditions are met. Such idle-stop systems enable fuel savings, reduced exhaust emissions, reduced vehicle noise, and the like.

Engines may be stopped at a desired position (for example, when the piston of a particular cylinder is at a particular position) to improve the engine starting during a subsequent restart. In vehicles configured to perform idle-stop operations, wherein engine stops and restarts are repeated multiple times during a drive operation, stopping the engine at the desired position may provide for more repeatable starts.

One example approach for selecting an engine stop position during an idle-stop operation is shown by Takahashi et al. in US 2008/0092841. Herein, during the idle-stop operation, an engine control apparatus is configured to identify a cylinder that has stopped during an intake stroke of the cylinder and to further specify a desired piston stop position in the cylinder. During a subsequent restart operation, the control apparatus then specifies a fuel injection amount, based on the cylinder and piston stop position, to stabilize the torque generated at engine restart and reduce chances of misfire upon restart.

However, the inventors herein have recognized several potential issues with such a system. As one example, during the subsequent restart, it may be difficult to determine an accurate aircharge estimate. This may be largely due to uncertainties in determining the actual initial engine position. Additionally, uncertainties in the mass of air trapped in the selected cylinder, uncertainties in cylinder air temperature, uncertainties in the residual gas fraction in the cylinder, and/or uncertainties in the amount of charge that has leaked after intake valve closing may contribute to engine position errors and consequently inaccurate aircharge estimates. To compensate for the engine position and aircharge estimate errors, the engine controller may bias the fuel injection amount at restart towards fueling rich. Due to the frequency of restarts experienced in a vehicle operating with idle-stop systems, frequent engine restarts that are biased fuel-rich (due to position errors) may degrade engine fuel consumption. And since a large percentage of vehicle hydrocarbon emissions occur during engine restart (when the catalyst has not yet reached light-off temperature), such restart operations may also result in increased hydrocarbon emissions. As a specific example, even assuming a cylinder is positioned in an intake stroke, due to variable valve timing operation, the exhaust valve may be open, and or the intake valve may be closed.

Thus, in one example, some of the above issues may be addressed by a method of controlling a vehicle system including an engine that is selectively deactivated during engine idle-stop conditions and selectively reactivated during engine restart conditions, the method comprising, during an engine restart from an idle-stop, performing a first combustion event in a cylinder with a piston at an engine crankshaft position that is retarded from a crankshaft position at which said cylinder's exhaust valve closes and advanced from a crankshaft position at which the cylinder's intake valve closes, during a cycle of said cylinder. The method may further comprise adjusting a valve overlap period of the cylinder to a shorter crankshaft angle duration and retarding a timing for intake valve closing within combustion stability limits.

In one example, an engine controller may be configured to perform a first combustion event in a cylinder whose piston is in a position that conforms to predefined criteria (such as indicated above). The piston of the first firing cylinder may be selected at the specified engine crankshaft position during engine restart or before the engine is reactivated (for example, before completion of the previous idle-stop operation and/or before the first combustion event at restart). Alternatively, the piston may be positioned according to the selected criteria during the engine restart or before the engine is reactivated using a starter motor system. Once a cylinder has been selected where the piston is at an engine crankshaft position that is retarded from a crankshaft position at which the cylinder's exhaust valve closes, and near and advanced from a crankshaft position at which the cylinder's intake valve closes, and further upon adjusting a valve overlap period of the cylinder to a shorter crankshaft angle duration, while retarding the timing for intake valve closure, the first combustion event may be performed when the piston of the cylinder is near the top dead center (TDC) of a compression stroke of the engine. As such, the predefined criteria for positioning the piston of the cylinder may be selected such that a substantially accurate aircharge estimate may be made in the first firing cylinder. In this selected position, the amount of residuals in the cylinder may be reduced, and properties used to estimate and/or infer a cylinder piston position, such as the cylinder air temperature and pressure, may be better estimated. By reducing positioning errors, inaccuracies in cylinder aircharge estimation may be reduced, thereby also reducing air-fuel ratio errors. In doing so, the quality and repeatability of engine restarts may be significantly improved. Additionally, improvements in vehicle fuel efficiency and fuel emissions may also be achieved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
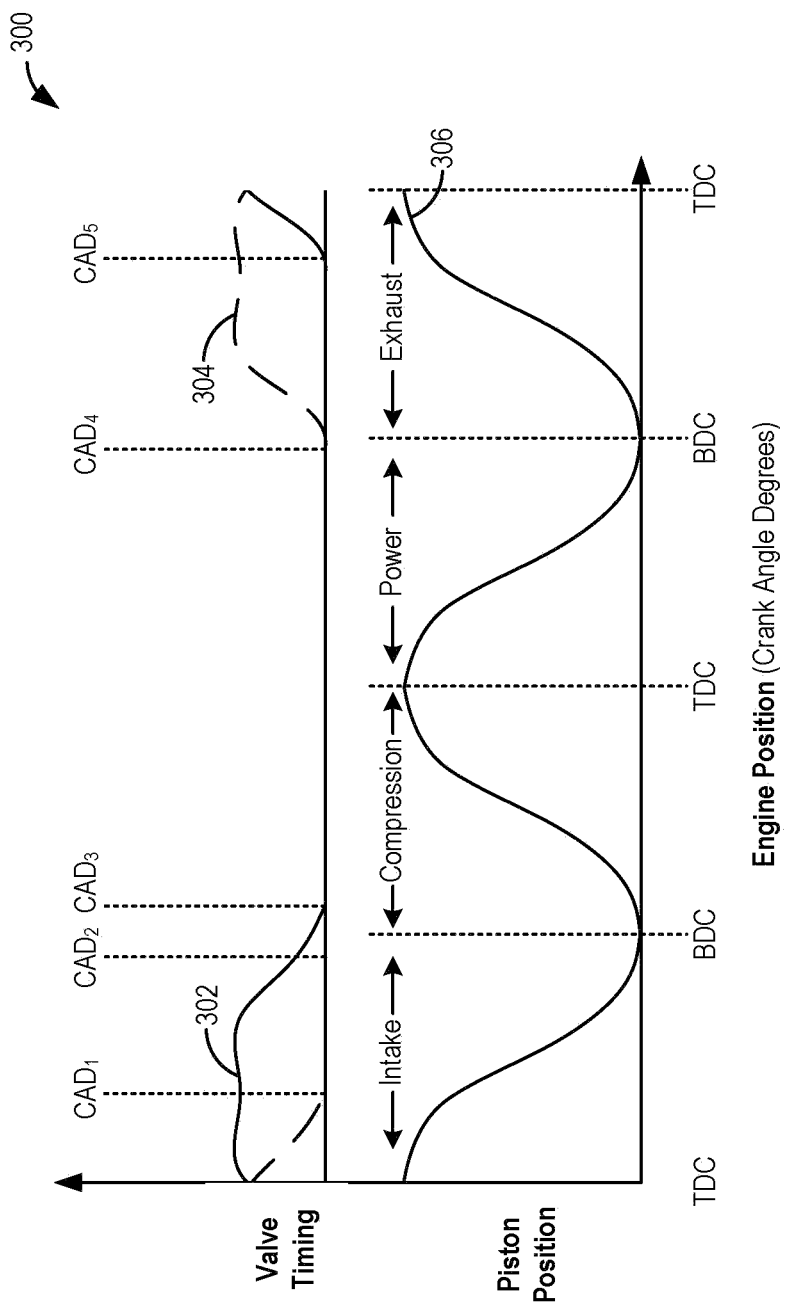
FIG. 3 shows a map for identifying and positioning a piston in a first firing cylinder according to the criteria selected in the present disclosure.
Figure 4:
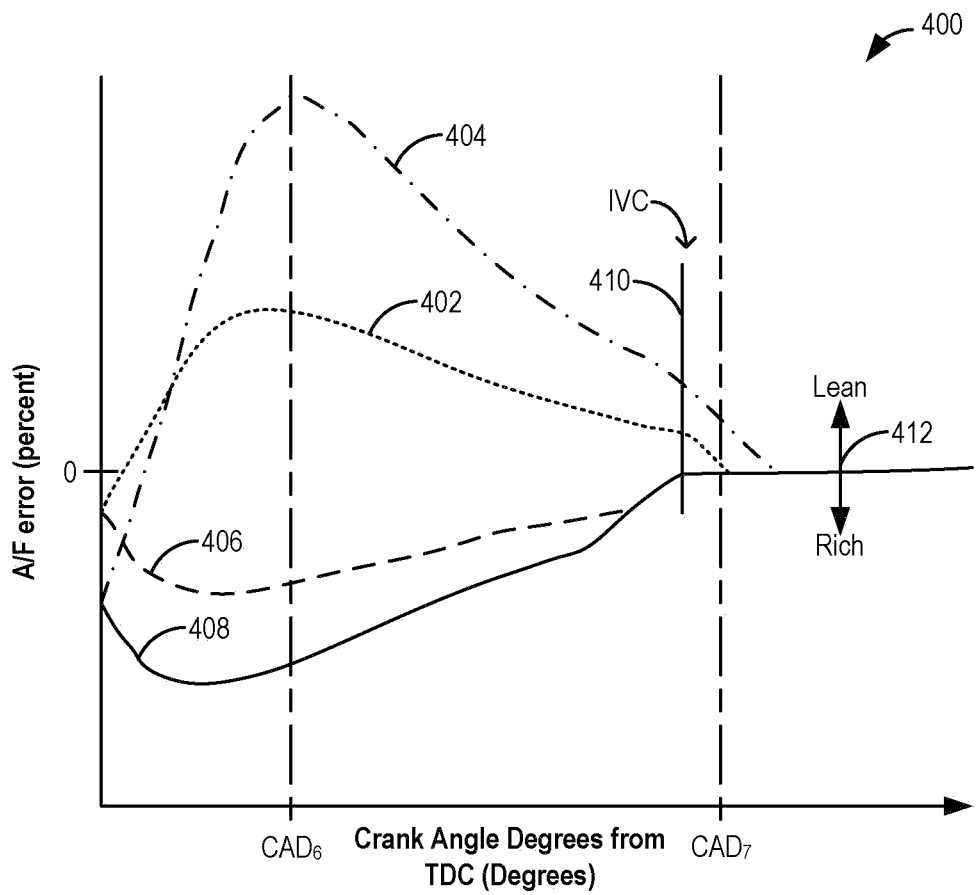
FIG. 4 shows a graph depicting the impact of angular position errors on the ability to accurately estimate an air-fuel ratio in the first firing cylinder.

The following description relates to systems and methods for reducing errors in estimating a cylinder position at engine restart to thereby reduce errors in aircharge estimation. As depicted in FIG. 4, based on the location of a first firing cylinder, small errors in engine position determination may have substantial impacts on the accuracy of aircharge estimation and air-fuel ratio determination in an engine. An engine controller may be configured to perform control routines, such as those depicted in FIGS. 5-6, during an engine idle-stop and/or restart operation, to position a first firing cylinder according to predefined criteria which minimize position errors and improve the aircharge estimation in the first firing cylinder. A map, such as depicted in FIG. 3, may also be used to identify and position a first firing cylinder according to the selected criteria. By reducing position errors in the first firing cylinder, the quality of engine restarts may be improved.

Figure 1:
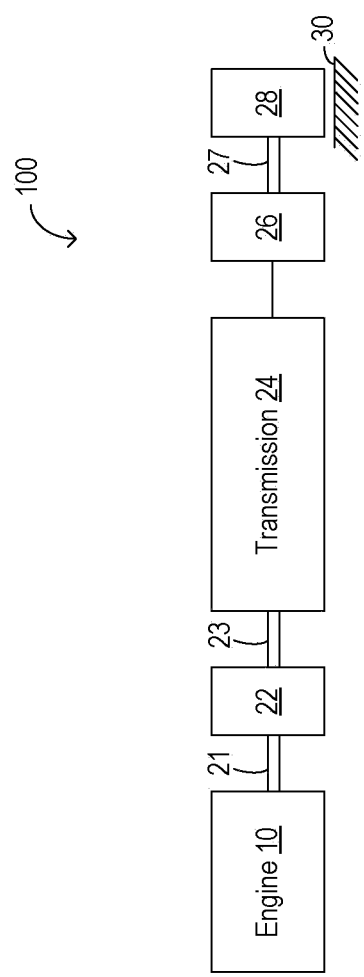
FIG. 1 shows an example vehicle system layout, including a vehicle powertrain.
Figure 2:
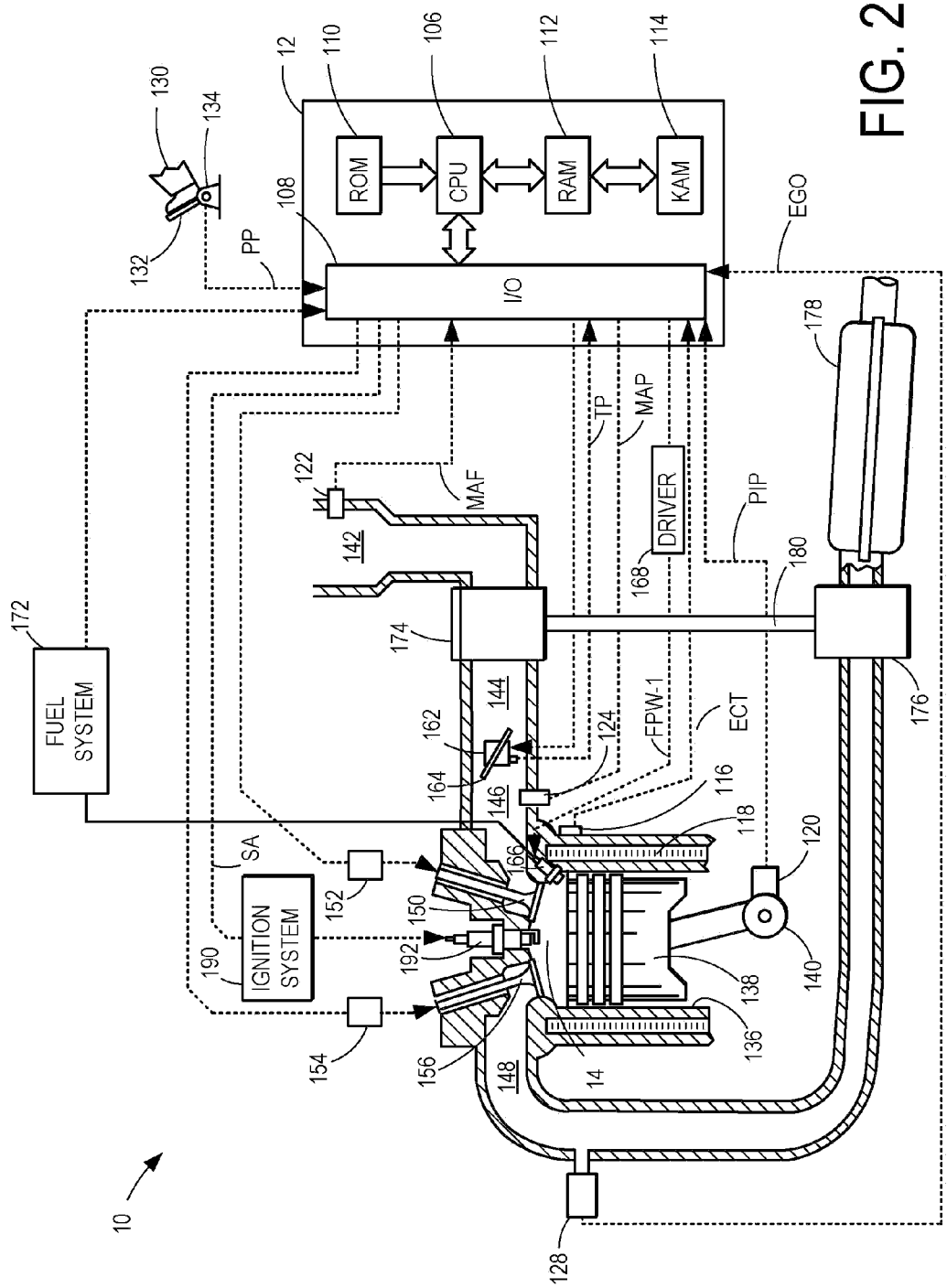
FIG. 2 shows a partial engine view.

FIG. 1 depicts an example embodiment of a vehicle system 100. As illustrated, an internal combustion engine 10, further described herein in FIG. 2, is shown coupled to torque converter 22 via crankshaft 21. Torque converter 22 is also coupled to transmission 24 via turbine shaft 23. Torque converter 22 has a bypass, or lock-up clutch (not shown) which may be engaged, disengaged, or partially engaged. When the clutch is either disengaged or partially engaged, the torque converter is said to be in an unlocked state. The lock-up clutch may be actuated electrically, hydraulically, or electro-hydraulically, for example. The lock-up clutch may receive a control signal from the controller (as shown in FIG. 2), such as a pulse width modulated signal, to engage, disengage, or partially engage, the clutch based on engine, vehicle, and/or transmission operating conditions.

Turbine shaft 23 is also known as a transmission input shaft. Transmission 24 comprises an electronically controlled transmission with a plurality of selectable discrete gear ratios. Transmission 24 also comprises various other gears, such as, for example, a final drive ratio 26. In alternate embodiments, a manual transmission operated by a driver with a clutch may be used. Further, various types of automatic transmission may be used. Transmission 24 is coupled to tire 28 via axle 27. Tire 28 interfaces the vehicle (not shown) to the road 30. In one embodiment, the powertrain of vehicle system 100 is coupled in a passenger vehicle that travels on the road.

FIG. 2 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 2, or may be alternatively provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation, and an exhaust valve controlled via cam actuation including CPS and/or VCT. In other embodiments, the intake and exhaust valves may be controlled by a common valve actuator or actuation system, or a variable valve timing actuator or actuation system. The engine may further include a cam position sensor whose data may be merged with the crankshaft position sensor to determine an engine position and cam timing.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including fuel injector 166 coupled directly to cylinder 14. Fuel injector 166 may inject fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 2 shows injector 166 as a side injector, it may also be located overhead of the piston, such as near the position of spark plug 192. Alternatively, the injector may be located overhead and near the intake valve. Fuel may be delivered to fuel injector 166 from high pressure fuel system 172 including a fuel tank, fuel pumps, and a fuel rail. Alternatively, fuel may be delivered by a single stage fuel pump at lower pressure. Further, while not shown, the fuel tank may have a pressure transducer providing a signal to controller 12.

It will be appreciated that in an alternate embodiment, injector 166 may be a port injector providing fuel into the intake port upstream of cylinder 14. It will also be appreciated that cylinder 14 may receive fuel from a plurality of injectors, such as a plurality of port injectors, a plurality of direct injectors, or a combination thereof.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type, such as a crankshaft position sensor) coupled to crankshaft 140; throttle position (TP) from a throttle position sensor; and absolute manifold pressure signal (MAP) from sensor 124. Engine speed signal, RPM, may be generated by controller 12 from signal PIP (or the crankshaft position sensor). Manifold pressure signal MAP from a manifold pressure sensor may be used to provide an indication of vacuum, or pressure, in the intake manifold. Storage medium read-only memory 110 can be programmed with computer readable data representing instructions executable by processor 106 for performing the methods described below as well as other variants that are anticipated but not specifically listed.

As described above, FIG. 2 shows only one cylinder of a multi-cylinder engine. As such each cylinder may similarly include its own set of intake/exhaust valves, fuel injector(s), spark plug, etc.

FIG. 3 shows a map 300 of valve timing and piston position with respect to an engine position. Based on the selection criteria for selecting a first firing cylinder, an engine controller may be configured to identify regions within this map wherein the first firing cylinder may be located. As depicted, the map illustrates an engine position along the x-axis in crank angle degrees (CAD). Curve 306 depicts piston positions, with reference to their location from top dead center (TDC) and/or bottom dead center (BDC), and further with reference to their location within the four strokes (intake, compression, power and exhaust) of the engine cycle. As indicated by sinusoidal curve 306, a piston gradually moves downward from TDC, bottoming out at BDC by the end of the intake stroke. The piston then returns to the top, at TDC, by the end of the compression stroke. The piston then again moves back down, towards BDC, during the power stroke, returning to its original top position at TDC by the end of the exhaust stroke.

Curves 302 and 304 depict valve timings for an exhaust valve (curve 302) and an intake valve (curve 304) during a normal engine operation. As illustrated, an exhaust valve may be opened just as the piston bottoms out at the end of the power stroke, such as at $CAD_4$. The exhaust valve may then close as the piston completes the exhaust stroke, remaining open at least until a subsequent intake stroke has commenced, for example, until $CAD_1$ (of the following cycle). Accordingly, in the present example, $CAD_4$ may represent a time of exhaust valve opening (EVO) and $CAD_1$ may represent a time of exhaust valve closing (EVC). In the same way, an intake valve may be opened at or before the start of an intake stroke, for example at $CAD_5$, and may remain open at least until a subsequent compression stroke has commenced, for example, until $CAD_3$. Accordingly, in the present example, $CAD_5$ may represent a time of intake valve opening (IVO) and $CAD_3$ may represent a time of intake valve closing (IVC).

Figure 5:
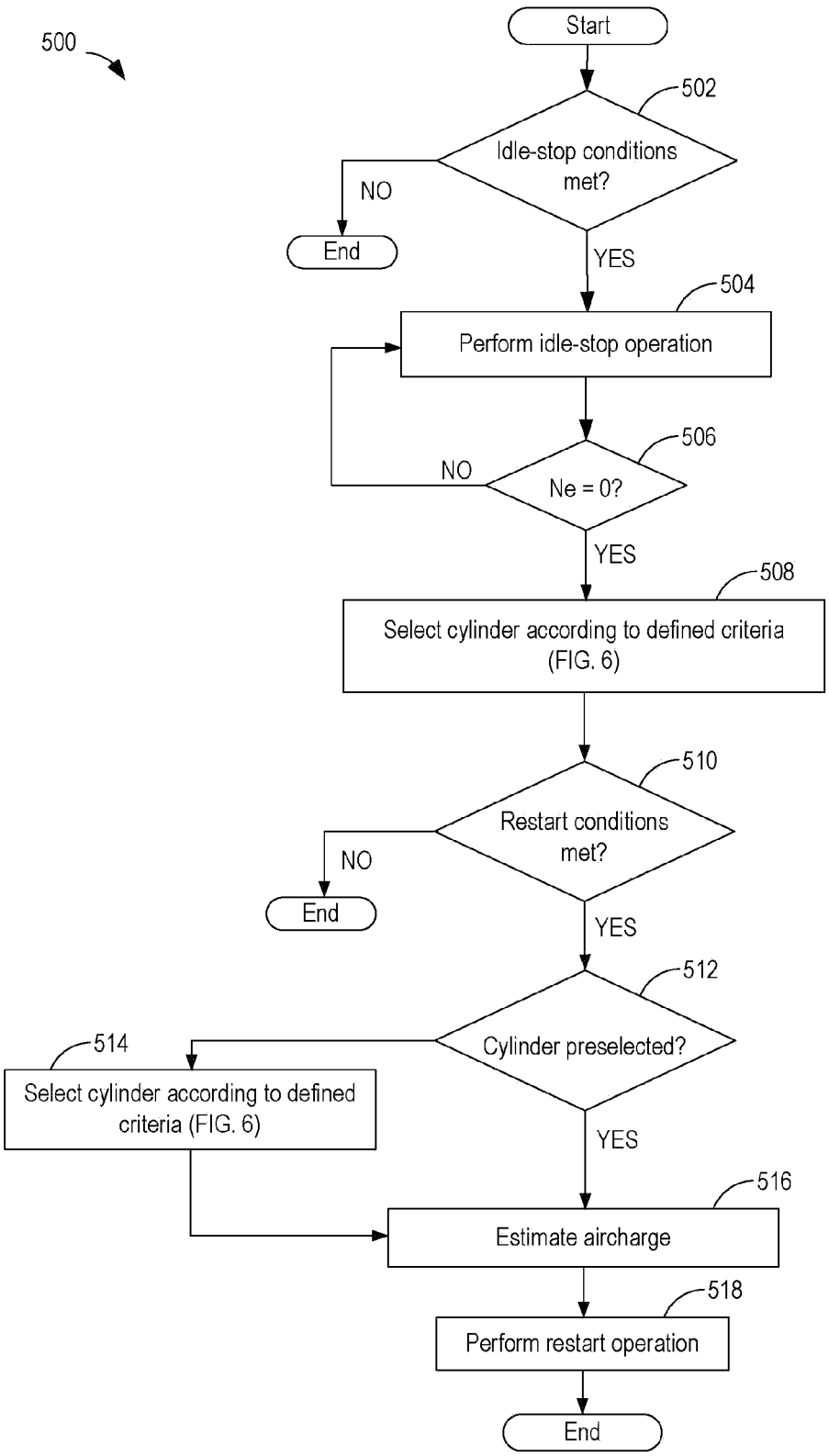
FIG. 5 shows a high level flow chart for executing an idle-stop operation and a subsequent restart operation with first firing cylinder selection, according to the present disclosure.
Figure 6:
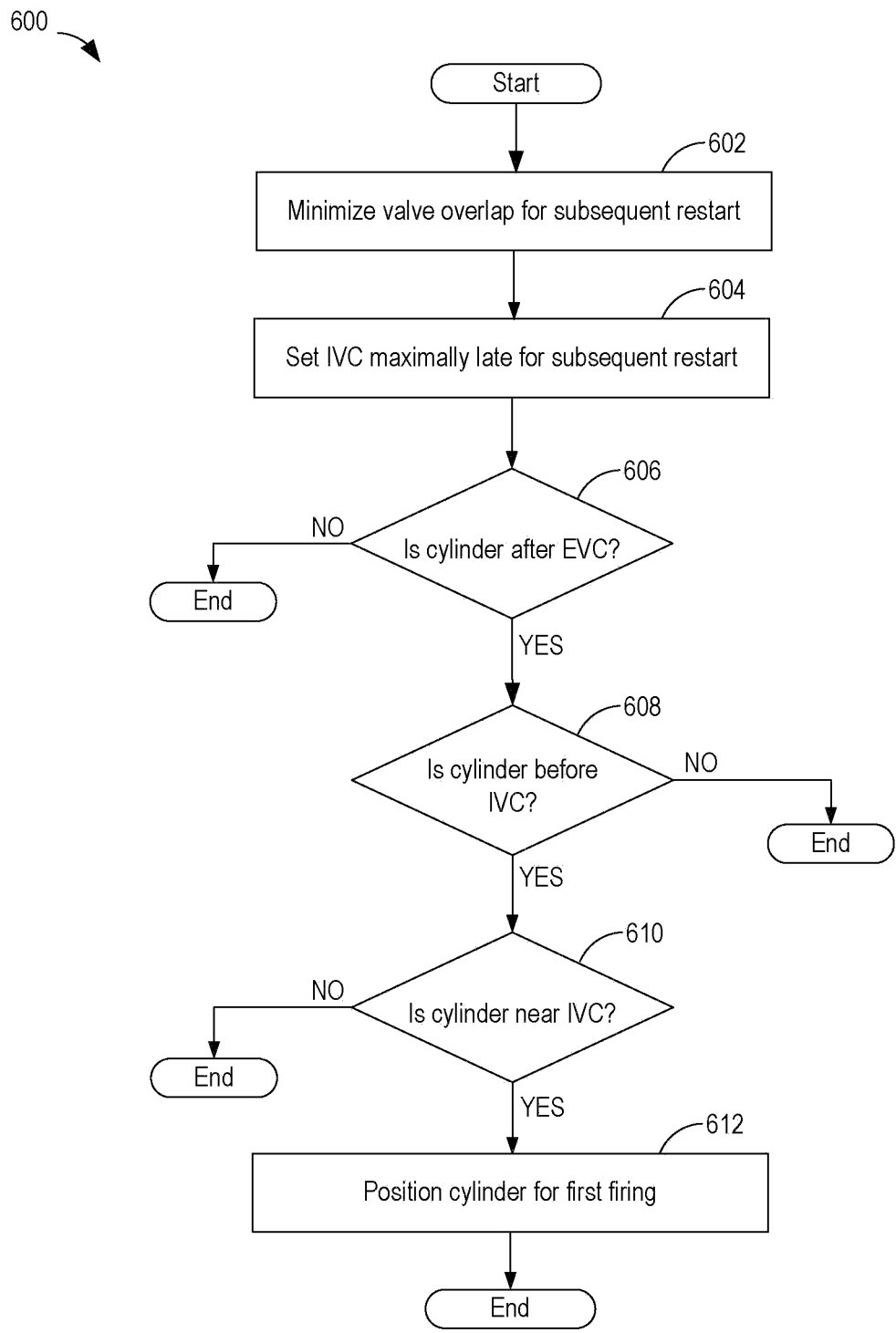
FIG. 6 shows a high level flow chart for selecting a first firing cylinder and positioning a piston therein during engine restart, according to the present disclosure.

As further elaborated with reference to FIGS. 4-6, the engine controller may be configured to identify and position a first firing cylinder on which to initiate combustion during engine reactivation from idle-stop conditions, based on selected criteria. As such, the criteria may define a crankshaft position or the position of a piston in the first firing cylinder with reference to EVO, EVC, IVO, and/or IVC. In one example, the piston of the first firing cylinder may be required to be positioned after EVC, but before the subsequent EVO. In this case, a cylinder positioned between $CAD_1$ and $CAD_4$ may be chosen. In another example, the first firing cylinder may additionally require to be positioned before IVC. In this case, a cylinder located between $CAD_1$ and $CAD_4$, but further located between $CAD_1$ and $CAD_3$ may be chosen. In yet another example, the piston of the first firing cylinder may still additionally require to be positioned near (for example, within 10 crank angle degrees) but not past IVC. In this case, the cylinder position may be narrowed to being between $CAD_2$ and $CAD_3$. Thus, the engine controller may be configured to identify and select a cylinder positioned between $CAD_2$ and $CAD_3$, based on the selected criteria, and may perform a first firing combustion in the selected cylinder during an engine restart from idle-stop conditions. As further elaborated with reference to FIG. 4, by selecting a first firing cylinder according to predefined criteria and by thereby reducing errors in the positioning of the first firing cylinder, the accuracy of aircharge estimates and the quality of engine restarts may be improved.

FIG. 4 shows a graph 400 depicting the impact of angular position errors at different positions of an engine, equipped with idle-stop functions, on the air-fuel ratio estimate of the first firing cylinder.

As such, idle-stop systems may or may not be configured to enable engine stop positioning after the engine has shut down. In one example, in idle-stop systems where the engine position cannot be affected once the crankshaft has stopped rotating, an alternator torque may be modulated during the engine shut-down to enable a higher consistency in the engine stop position. In another example, idle-stop systems may be configured with a modified starter motor that enables the engine position to be adjusted after the crankshaft has stopped rotating. In either situation, the selective positioning of the engine before the subsequent restart enables more consistent restart times, in part by improving the accuracy with which the aircharge of the first cylinder, to which fuel and spark is applied during the restart, is estimated.

When the crankshaft is at rest prior to engine restart, the intake and exhaust manifold pressures may rapidly converge to an atmospheric (barometric) pressure. For a given cylinder, if the piston is positioned between EVC and IVC, the cylinder pressure will equal the intake manifold pressure, or the atmospheric pressure. If the piston is positioned between IVC and EVO, the cylinder pressure may take some time (for example, two to ten seconds) to converge to atmospheric pressure. Based on this cylinder pressure relationship, the aircharge mass in the first firing cylinder may be calculated as $m_a = P_{MAP} V_{sw} / RT_a$ where $m_a$ is the aircharge mass in the first cylinder to fire, $P_{MAP}$ is the intake manifold pressure (or atmospheric pressure), $V_{sw}$ is the swept volume (which is a function of the engine position at rest), and $T_a$ is the cylinder air temperature (which is a function of the engine coolant temperature). Therefore if the first cylinder is positioned between EVC and IVC, there may be no substantial error in using the intake manifold pressure for an aircharge estimation in the first cylinder. Further if the first cylinder is positioned before IVC or slightly after, the swept volume used to calculate the first cylinder aircharge may be a constant value or a value that is only a function of IVC. Therefore, the selected cylinder position may be one in which the cylinder is positioned between EVC and IVC.

As such, errors in estimating a cylinder air-fuel ratio may be directly correlated to errors in estimating a cylinder aircharge. As shown, the map represents an engine position in crank angle degrees from TDC along the x-axis while percent error in air-fuel ratio estimation is represented along the y-axis. Based on the actual position of the first firing cylinder with respect to intake valve closing (IVC, represented at 410), a small error in position determination may have a significant impact on air-fuel ratio estimation. As such, the error in air-fuel ratio estimation may be biased lean or rich (represented at 412). Map 400 depicts curves 402-408 representing four examples wherein the position error is, respectively, −10 degrees, +10 degrees, −20 degrees, and +20 degrees.

As shown in FIG. 4, when the first firing cylinder's piston position is located after IVC, a small error in the measured position can lead to a significant error in the swept volume calculation. Further, this error as a percentage of the total swept volume tends to increase as the total swept volume decreases, that is, as the initial piston position approaches TDC. As one example, when the first firing cylinder is located at $CAD_6$, that is significantly before intake valve closing, a position error of −20 degrees (curve 404) may translate into a substantially greater error in air-fuel ratio estimation as compared to a position error of −10 degrees (curve 402), +10 degrees (curve 406), or +20 degrees (curve 408). In contrast, when the first firing cylinder is located at $CAD_7$, that is near but after intake valve closing, position errors of −20 degrees (curve 404) and −10 degrees (curve 402) may translate into a substantially lower error in air-fuel ratio estimation, while position errors of +10 degrees (curve 406), and +20 degrees (curve 408), may translate into substantially negligible errors in air-fuel ratio estimation. Accordingly, an engine controller may be configured to position the first firing cylinder near IVC where engine position errors may not significantly affect aircharge estimates.

Similar maps with reference to other cylinder selection and piston positioning parameters, such as exhaust valve closing and valve overlap periods, may enable an engine controller to determine selection criteria for the first firing cylinder. In one example, the criteria may consider engine combustion stability limits. By using the thus determined criteria to select the first firing cylinder, errors in aircharge estimation may be reduced. By estimating an aircharge in the cylinder after positioning the piston of the cylinder, based on the selected criteria, and then fueling the cylinder based on the estimated aircharge, the repeatability of restarts may be improved.

As such, for an engine with four or more cylinders, there may always be a cylinder located between EVC and IVC when the crankshaft is at rest. On an I3 engine, the cylinder spacing may exceed the crank angle spacing between EVC and IVC. Herein, there may be instances when none of the cylinders are located between EVC and IVC. In such a case, an engine controller may be configured to select a cylinder that is just after IVC, or to use a starter motor system, if available, to rotate the engine to position one of the pistons between EVC and IVC. For example, the starter motor system may position the cylinder which will be used as the first firing cylinder just before IVC, that is, after EVC and a few degrees before IVC. In this way, consistency in air-fuel ratios and torque outputs from the first firing cylinder may be achieved in addition to consistent re-start times.

FIG. 5 describes a routine 500 for performing an idle-stop operation with initial cylinder selection and piston positioning, and a subsequent restart operation, in the vehicle system of FIG. 1. The routine enables a first firing cylinder to be selected wherein the piston is positioned according to selected criteria either during the engine restart (that is, before reactivation of the engine and before the first combustion event) or before the end of idle-stop (that, while the engine is "at rest").

At 502, it is confirmed if idle-stop conditions have been met. Any or all of the idle-stop conditions, as further described herein, may be met for an idle-stop condition to be confirmed. For example, an engine status may be determined to verify that the engine is operating (e.g., carrying out combustion). A battery state of charge (SOC) may be determined. For example, if the battery SOC is more than 30%, it may be determined that battery recharge may not be required and that the engine idle-stop may proceed. The vehicle running speed may be determined to confirm that it is within a desired range, for example, no more than 30 mph. An air-conditioner status may be assessed to verify that the air conditioner did not issue a request for restarting the engine, as may be requested if air conditioning is desired. The engine temperature may be estimated and/or measured to determine if it is within a selected temperature range. In one example, the engine temperature may be inferred from an engine coolant temperature and an engine idle-stop condition may be selected when the engine coolant temperature is above a predetermined threshold. A throttle opening degree may be determined using a throttle opening degree sensor. In one example, the sensor reading may be used to verify that a start has not been requested by the vehicle driver. The driver requested torque may be estimated to confirm that it is less than a predetermined threshold value. A brake sensor status may also be read. In one example, the brake sensor may read the status of the brake pedal and verify that the brake pedal has been pressed. An engine speed may be determined to verify that it is at or below a predetermined threshold. Similarly, an input shaft rotation number may be determined, to verify that it is at or below a predetermined threshold.

If idle-stop conditions are not met, the routine may end. However, if any or all of the idle-stop conditions are met, then at 504, the controller may initiate execution of the idle-stop operation and proceed to deactivate the engine. That is, the engine may be selectively deactivated when low or no engine torque is required. This may include shutting off fuel and/or spark to the engine. At 506, it may be determined whether the engine has come to a halt (that is, engine speed is at zero). While in the depicted example it is confirmed that the engine has come to a complete halt, in alternate embodiments, it may be confirmed that the engine is at a near-zero speed, for example between 0 and 50 rpm. At 508, before completing the idle-stop operation, a first firing cylinder may be selected whose piston position conforms to selected criteria, the selected cylinder piston position favoring a minimization of errors in estimating the cylinder aircharge. Furthermore, the position may be within combustion stability limits. As further elaborated below, with reference to FIG. 6, the cylinder may be selected where the piston position conforms to the selected criteria such that during a subsequent engine restart, the cylinder aircharge may be estimated with reduced errors, thereby enabling improved fuel efficiency, and reduced chance of misfire upon restart. In one example, the selected cylinder may have the desired piston at the time the engine stops during a final shutdown, and before further engine reactivation. However, in another example, the first firing cylinder may be selected and the information may be stored in the controller so that the cylinder's position may be appropriately positioned during engine restart (for example, using a starter motor system), before a first combustion event. In this case, the selected position may not be an actual position at which the engine is deactivated.

The engine may remain in idle-stop, for example in the selected position, until restart conditions are satisfied at 510. Any or all of the restart conditions, as further described herein, may be met for a restart condition to be confirmed. Specifically, the engine may be reactivated when a given level of engine torque is requested. For example, the engine status may be determined to verify that it is in idle-stop status. The torque requested by the driver may be estimated to confirm that it is above a predetermined threshold. The status of the air conditioner may be checked to verify whether a request has been made to restart, as may be made when air conditioning is desired. The battery SOC may be estimated to confirm that it is below a predetermined threshold (for example, below 30%) such that an engine restart may be required to charge the battery to a desired value. The emission control device may be monitored to verify whether restart request has been made. For example, the emission control device temperature may be estimated and/or measured by a temperature sensor, and if the temperature is below a predetermined threshold, an engine restart may be requested. The vehicle speed may be estimated to confirm that it is above a predetermined threshold. The accelerator pedal position may be determined, for example by reading a pedal position sensor, to determine whether the accelerator pedal has been engaged, and/or a brake pedal has been released. An electrical load of the engine may be determined to confirm whether it is above a predetermined threshold, in response to which an engine start would be requested (for example, to reduce draining of the battery). In one example, the electrical load may comprise user operated accessory devices, electrically powered air-conditioning, etc.

If restart conditions are not met at 510, the routine may end. However, if any or all of the restart conditions are met, then at 512, it may be confirmed whether a first firing cylinder has already been selected. In one example, the first firing cylinder may have been selected and the piston therein may have accordingly been positioned during the preceding idle-stop operation. Alternatively, the first firing cylinder may have been selected and the piston position may have been specified, but the cylinder may not have been positioned accordingly during the preceding idle-stop operation. If so, based on the position indicated to the controller, the cylinder piston may be positioned during the engine restart before reactivation of the engine. If the cylinder has not been selected at 512, then at 514, as further elaborated in FIG. 6, the engine controller may be configured to select a cylinder for the first combustion event, the selected cylinder conforming to the predetermined criteria. At 516, an aircharge estimate may be made with reduced errors. At 518, the restart operation may be initiated and the engine may be reactivated. This may include turning on fuel and/or spark to the engine, and performing a first combustion firing in the selected cylinder. As such, this may further include estimating an aircharge in the selected cylinder after selecting a first firing a cylinder and positioning the piston according to the predetermined criteria, and then determining a fuel injection amount based on the estimated cylinder aircharge. In this way, at the subsequent engine restart, an accurate aircharge estimate may be made, thereby enabling improved fuel efficiency, and reduced chance of misfire.

Now turning to FIG. 6, a routine 600 is described for selecting the cylinder in which to perform a first combustion event during engine restart. The cylinder may be selected wherein the piston position conforms to predetermined criteria. The criteria may be selected to allow an aircharge estimate to be made with minimal errors and with minimal impact from errors in cylinder positioning. In one example, the routine of FIG. 5 may be performed as part of an engine idle-stop operation (as elaborated in FIG. 5, at 508), specifically during and/or after engine spin-down. Alternatively, the routine of FIG. 6 may be performed as part of an engine restart operation (as elaborated in FIG. 5, at 514), specifically before reactivating the engine, for example using a starter motor system to assist in cylinder positioning at rest, before engine restart.

At 602, valve overlap period may be minimized. That is, the valve overlap period may be adjusted to a shorter crankshaft angle duration before reactivating the engine. As such, the valve overlap period may correspond to an engine position wherein both intake and exhaust valves are open. Specifically, this may correspond to a time towards the end of an exhaust stroke when the exhaust valve is on its closing ramp, but has not closed yet, and the intake valve is on its opening ramp, but the intake stroke has not started yet. With reference to engine positions and valve timings of FIG. 3, this may correspond to a region between $CAD_5$ and $CAD_1$. In one example, the valve overlap period may be reduced to a shorter crankshaft angle duration during an engine idle-stop operation preceding the engine restart. Alternatively, the valve overlap period may be reduced to a shorter crankshaft angle duration at the onset of the engine restart operation. By minimizing valve overlap, the amount of exhaust drawn into the intake manifold may be substantially reduced. Thus, by maximizing the amount of fresh air that is drawn into the intake manifold (whose temperature, density, pressure, and other related parameters may be more accurately determined and/or inferred), errors in aircharge estimation can be significantly reduced.

At 604, settings for intake valve closing (IVC) may be adjusted to be maximally late. That is, the timing for intake valve closing may be retarded before reactivating the engine. As such, the retarded IVC timing selected may be within engine combustion stability limits. With reference to the engine positions and valve timings of FIG. 3, this may correspond to shifting IVC from $CAD_3$, to a position further along the compression stroke and further away from BDC. The settings may be adjusted before engine reactivation and/or before selecting a cylinder in which to perform the first combustion event. By retarding IVC, the aircharge of the first firing cylinder may be minimized. This enables a "compression release" for faster crank speeds, thereby minimizing the time to torque.

At 606, as a first criterion for cylinder selection, it may be confirmed whether the cylinder, at rest and before restart, has a piston that is positioned after exhaust valve closing (EVC). As one advantage, in a piston positioned after EVC, a possibility that the cylinder has been filled with residual exhaust gas (during the preceding engine shut down operation) is reduced. As such, this allows the chance of misfire to be substantially reduced. If the cylinder is not positioned after EVC, the routine may end. Else, the routine may continue to confirm the next criterion.

At 608, it may be confirmed whether the piston is further positioned before intake valve closing (IVC). As one advantage, in a cylinder positioned before IVC, the initial air density may be accurately estimated. As such, the air density is a function of initial cylinder air pressure and temperature. In one example, the initial cylinder air pressure may be the manifold air pressure (MAP), as determined by a MAP sensor. Alternatively, the initial cylinder air pressure may be a barometric pressure (BP), as determined by a pressure sensor. Further still, the initial cylinder air pressure may be inferred from an estimate of MAP and/or BP. As another advantage, a piston positioned before IVC may have substantially no leak-down. Furthermore, such a cylinder may also have substantially no loss in its heat of compression. If the piston is not positioned before IVC, the routine may end. That is, it may be confirmed that the cylinder piston is positioned between EVC and IVC, but not between IVC and EVO. If so, the routine may continue to confirm the next criterion.

At 610, it may be confirmed whether the cylinder piston is further positioned near (but not past) IVC. As one example, the cylinder may be positioned within 10 crank angle degrees of IVC. As one advantage, in a cylinder where the piston is positioned close to IVC, the possibility of drawing in exhaust gas that may have entered the intake manifold is reduced. As another advantage, the cylinder air temperature is substantially similar to the engine coolant temperature, thereby allowing the cylinder air density to be determined and/or inferred with greater accuracy. As yet another advantage, the crank angle range for a first angle-to-torque estimation is reduced under the constraints of accurate cylinder aircharge estimation. As previously elaborated with reference to FIG. 4, position errors in a cylinder positioned close to IVC may have significantly negligible impacts on aircharge estimates and air-fuel ratio errors. If the cylinder piston is not positioned near IVC, the routine may end. Else, at 612, the routine may select a cylinder wherein the piston position conforms to all the criteria presented at 606-610, for initiating a first combustion event at engine restart. That is, a cylinder may be selected wherein the piston is positioned after EVC, further positioned near and before IVC, and having the shorter crankshaft angle duration of valve overlap and retarded intake valve closing timing.

In one example, before an engine idle-stop operation, the valve overlap period may be at a first, longer, crankshaft angle duration and the timing for intake valve closure may be set to a first, advanced (that is, less retarded) value. Upon confirmation of idle-stop conditions, the engine may be deactivated. However, following the engine idle-stop and before the engine is reactivated, that is before a subsequent first combustion event, the valve overlap period may be adjusted to a second, shorter, crankshaft angle duration and the timing for intake valve closure may be set to a second, retarded value (that is, less advanced or more retarded than the first value). Then, with the shorter crankshaft angle duration of valve overlap and the retarded intake valve closure timing, a first cylinder in which to perform the first combustion event may be selected such that the piston of the cylinder, at rest, is at an engine crankshaft position that is retarded from a crankshaft position at which the cylinder's exhaust valve closes and near and advanced from a crankshaft position at which the cylinder's intake valve closes. Then, upon confirmation of restart conditions, the engine may be restarted with a first combustion event in the selected cylinder.

In this way, by performing a first combustion firing in a cylinder which at restart is positioned after exhaust valve closing, and is further positioned before and near, but not past, intake valve closing, while having a lower value of valve overlap and a later value of intake valve closing timing, engine position errors may be reduced and the repeatability of restarts may be improved. Specifically, position errors in a first firing cylinder and related uncertainties in estimating the cylinder aircharge, during an engine restart, can be substantially reduced. By improving the accuracy with which an aircharge estimate is made, the accuracy with which fuel is injected into the first firing cylinder can be increased. In particular, in engines equipped with idle-stop systems (and frequent engine restarts), the frequency with which a fuel-rich biased injection is required can be substantially reduced. In doing so, the fuel efficiency and emissions level of an engine can be substantially improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
responsive to idle-stop engine shutdown, retarding intake valve closing; and
during a subsequent engine restart from the idle-stop, performing a first combustion event from rest in a cylinder with a piston at an engine crankshaft position that is retarded from a crankshaft position at which said cylinder's exhaust valve closes, and advanced from a crankshaft position at which the cylinder's intake valve closes, during a cycle of said cylinder.

2. The method of claim 1 further comprising, during the subsequent engine restart, adjusting a valve overlap period of the cylinder to a shorter crankshaft angle duration.

3. The method of claim 2 wherein the retarded intake valve closing timing is within engine combustion stability limits.

4. The method of claim 3 wherein the piston of the cylinder is positioned at the engine crankshaft position during the subsequent engine restart before reactivating an engine.

5. The method of claim 4 wherein the first combustion event is performed when the piston of the cylinder is near a top dead center of a compression stroke of the engine.

6. The method of claim 5 wherein performing a first combustion event in the cylinder includes estimating an aircharge in the cylinder after positioning the piston of the cylinder, and then fueling the cylinder based on the estimated aircharge.

7. A method, comprising:
during a subsequent engine restart from an idle-stop, performing a first combustion event in a cylinder with a piston at an engine crankshaft position that is retarded from a crankshaft position at which said cylinder's exhaust valve closes, and advanced from a crankshaft position at which the cylinder's intake valve closes, during a cycle of said cylinder, the piston being positioned at the engine crankshaft position during the subsequent engine restart before reactivating an engine from rest.

8. The method of claim 7 further comprising, during the subsequent engine restart, adjusting a valve overlap period of the cylinder to a shorter crankshaft angle duration.

9. The method of claim 8 further comprising, during the subsequent engine restart, retarding a timing for intake valve closing, the retarded intake valve closing timing within engine combustion stability limits.

10. The method of claim 7 wherein the first combustion event is performed when the piston of the cylinder is near a top dead center of a compression stroke of the engine.

11. The method of claim 10 wherein performing a first combustion event in the cylinder includes estimating an aircharge in the cylinder after positioning the piston of the cylinder, and then fueling the cylinder based on the estimated aircharge.

12. A method, comprising:
during a subsequent engine restart from an idle-stop, performing a first combustion event from rest in a cylinder with a piston at an engine crankshaft position that is retarded from a crankshaft position at which said cylinder's exhaust valve closes, and advanced from a crankshaft position at which the cylinder's intake valve closes, during a cycle of said cylinder, including estimating an aircharge in the cylinder after positioning the piston of the cylinder, and then fueling the cylinder based on the estimated aircharge.

13. The method of claim 12 further comprising, during the subsequent engine restart, adjusting a valve overlap period of the cylinder to a shorter crankshaft angle duration.

14. The method of claim 13 further comprising, during the subsequent engine restart, retarding a timing for intake valve closing, the retarded intake valve closing timing within engine combustion stability limits.

15. The method of claim 14 wherein the piston of the cylinder is positioned at the engine crankshaft position during the subsequent engine restart before reactivating an engine.

16. The method of claim 15 wherein the first combustion event is performed when the piston of the cylinder is near a top dead center of a compression stroke of the engine.

* * * * *